United States Patent
Goldberg

[15] 3,695,644
[45] Oct. 3, 1972

[54] BALL TYPE FLEXIBLE COUPLING FOR RIGID CONDUITS

[72] Inventor: Leonard Z. Goldberg, Canoga Park, Calif.

[73] Assignee: Lockheed Aircraft Corporation, Burbank, Calif.

[22] Filed: March 30, 1970

[21] Appl. No.: 23,811

[52] U.S. Cl. .................................. 285/233, 285/166
[51] Int. Cl. ............................................... F16l 27/04
[58] Field of Search ..................... 285/166, 233, 261

[56] References Cited

UNITED STATES PATENTS

| | | |
|---|---|---|
| 2,852,282 | 9/1958 | Smisko et al. ........... 285/166 X |
| 3,540,758 | 11/1970 | Torres ..................... 285/233 |
| 3,052,491 | 9/1962 | Grass ....................... 285/233 |
| 2,329,369 | 9/1943 | Haver ..................... 285/166 X |
| 2,286,566 | 6/1942 | Norton ................... 285/261 X |

FOREIGN PATENTS OR APPLICATIONS

| | | |
|---|---|---|
| 881,504 | 1/1943 | France ....................... 285/166 |
| 858,049 | 12/1952 | Germany ................... 285/261 |
| 537,764 | 5/1955 | Belgium ..................... 285/261 |
| 1,084,987 | 7/1960 | Germany ................... 285/233 |

*Primary Examiner*—Thomas F. Callaghan
*Attorney*—Lowell G. Turner and George C. Sullivan

[57] ABSTRACT

A coupling designed to provide a pressure tight connection between a pair of rigid tubular conduits despite misalignment. The coupling includes cylindrical sealing surfaces as well as mating spherical surfaces, one integral with or secured to the conduit and the second being a part of the coupling housing. The disclosure shows the use of conventional 0 ring type seals positioned between cylindrical sealing surfaces. The centers of the spherical surfaces are located at the axis of the conduit and aligned with the seal portion so that relative movement of the conduit with respect to the coupling also produces longitudinal movement of the conduit and minimal compressive loading of the 0 ring seal.

An arrangement of coupling parts employing split or C ring parts and cooperating wedge ring is disclosed to provide noncaptive mounting parts.

3 Claims, 9 Drawing Figures

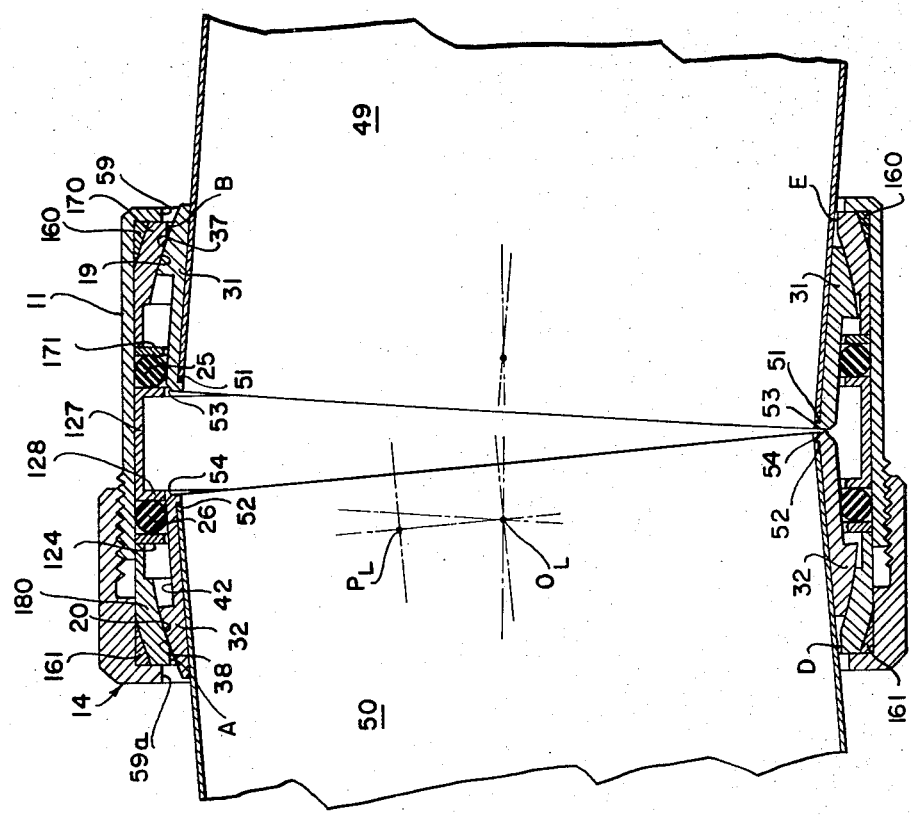
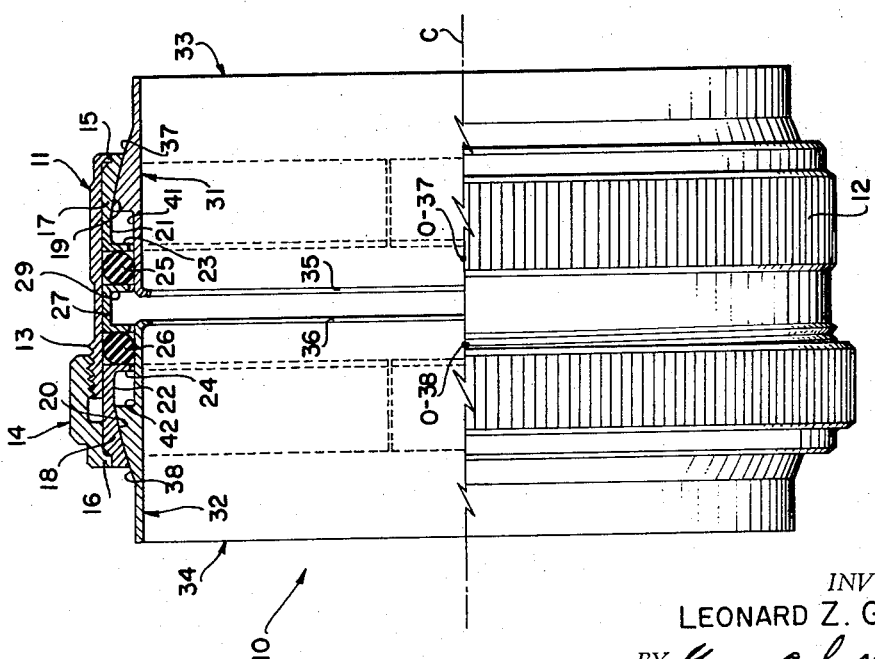

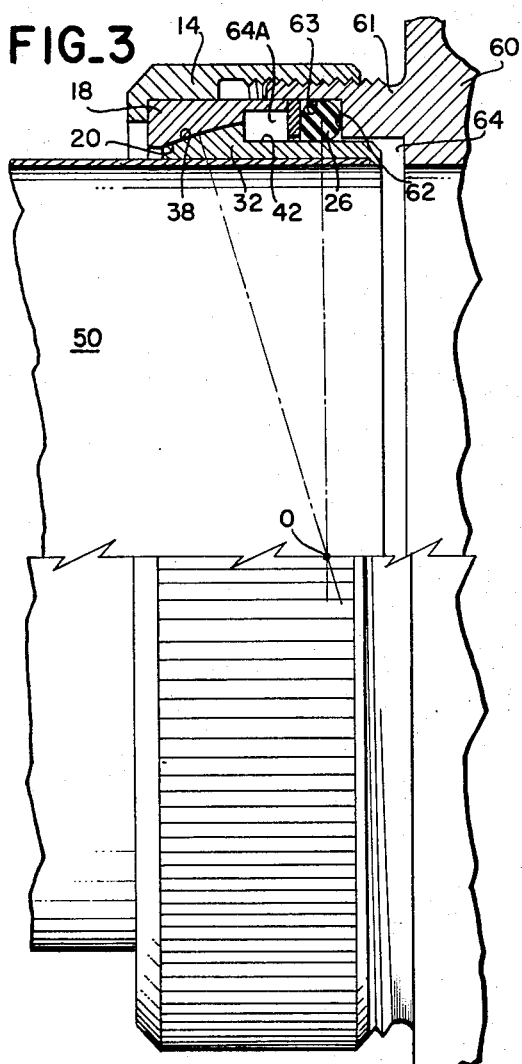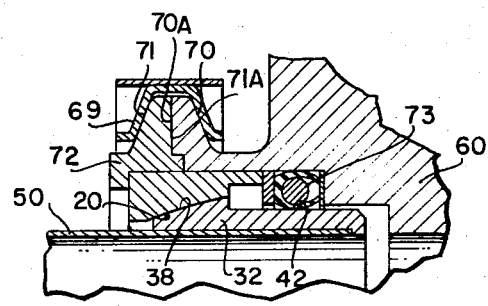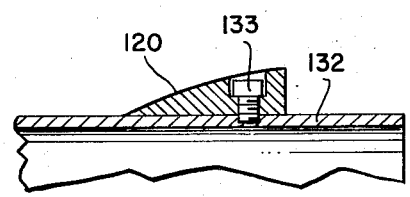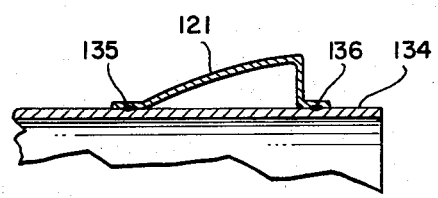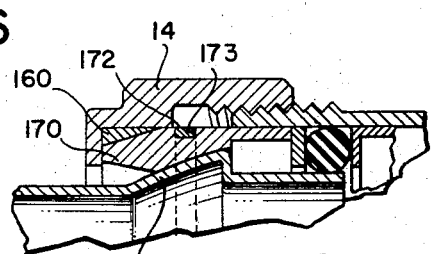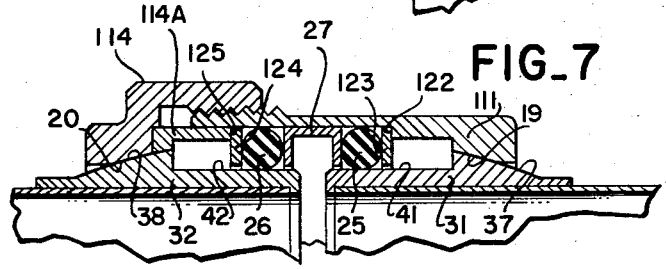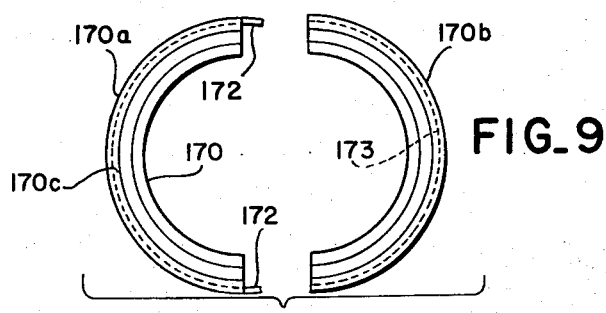

3,695,644

BALL TYPE FLEXIBLE COUPLING FOR RIGID CONDUITS

BACKGROUND OF THE INVENTION

The need for improved couplings for rigid conduits has long been recognized. One of the most critical requirements is to allow for angular or translation misalignment or in some cases relative movement of the conduits without loss of pressure or fluid. In the past, many couplings have been designed employing mating spherical surfaces in the conduit and seal to allow angular movement. These couplings have assumed complex forms and invariably have required sealing of the spherical surfaces.

BRIEF STATEMENT OF THE INVENTION

I have produced a spherical coupling which exhibits an ability to accept conduit misalignment or movement employing a minimum number of seals and no seals in the spherical regions. Furthermore, simple O ring seals are used and so positioned that they are primarily loaded in compression for effective sealing.

Basically, the invention employs a ferrule having a cylindrical portion and a spherical portion. A body member includes a spherical portion and a cylindrical seal retaining portion. A seal is retained and compressed between the cylindrical portions of the body and ferrule.

In one embodiment, the seal employs a split ring spherical portion and a separable continuous wedge ring which cooperate to provide a spherical bearing surface with hoop strength and positioning provided by the wedge ring.

In certain embodiments, the O ring or actual seal member is loaded only in compression transverse to the axis in the conduit and in other embodiments, the O ring is packed, that is, axially loaded as well by a controlled predetermined load.

DETAILED DESCRIPTION OF THE DRAWINGS

This invention may be more clearly understood by the following detailed description and by reference to the drawing in which:

FIG. 1 is an elevational view partially in section of the coupling in accordance with the principle of this invention;

FIG. 2 is a vertical section through a coupling of a type of FIG. 1 shown mounted on conduits with approximately 16° of angular deviation between the conduit;

FIG. 3 is a vertical section through a half coupling incorporating the principle of this invention;

FIG. 4 is a fragmentary sectional view of a coupling incorporating the principle of this invention but employing a different type of locking member and seal;

FIG. 5 is a fragmentary sectional view of an alternate embodiment of spherical surface attachment;

FIG. 6 is another alternate version of spherical surface attachment;

FIG. 7 is a fragmentary sectional view of an embodiment of this invention employing captive coupling parts;

FIG. 8 is an enlarged detail of the assembly of FIG. 1 showing the relationship between the split ring and the locking wedge ring; and, FIG. 9 is an expanded view of the C ring of FIG. 8.

DETAILED DESCRIPTION OF THE INVENTION

Now referring to FIG. 1, a coupling 10 employing this invention may be seen as including a first body portion 11 having a knurled hand grip region 12 and a threaded region 13 which engages a second body portion or nut 14. Both the body portion 11 and the nut 14 include respective annular retainer portions or lips 15 and 16 which position and retain split rings 17 and 18, respectively. The split rings 17 and 18 include respective hollow spherical surfaces 19 and 20 constituting segments of a sphere. The split rings 17 and 18 also include cavities or relieved portions 21 and 22, respectively, terminating in respective annular walls 23 and 24. The walls 23 and 24 constitute retainers for seal members 25 and 26 shown as simple conventional O rings. On the opposite or central side of the O rings 25 and 26 is a common "U" cross-section back-up ring 27 axially aligned within the body portion 11 and having internally extending legs 28 and 29, which may be directed radially inward, as shown, or reversed for outward direction.

Positioned within the body and nut assembly are a pair of ferrule members 31 and 32 including internal cylindrical walls 33 and 34 and each having an end lip or retainer 35 and 36. The cylindrical internal wall portions 33 and 34 are designed to match the outside diameter of conduits intended to be secured and sealed together by the coupling of this invention. The end walls or lips 35 and 36 constitute stops to limit the entrance of the conduits into the coupling. The ferrules are secured to the respective conduit ends by welding, swaging or other well-known methods of attachment.

The ferrules 31 and 32 are characterized by spherical surfaces 37 and 38, respectively, which engage the mating surfaces 19 and 20 of the split rings 17 and 18. The mating spherical surfaces have their center on or near the center line C of the coupling and the mating surfaces are dimensioned for close slip fit. Sealing of the coupling and the entire joint is accomplished not at the spherical surfaces but between the O rings 25 and 26 and its contacted surfaces, principally the cylindrical surface 41 and 42 and in the case of O rings 25 and 26, with the cylindrical surfaces 41 and 42 of their respective ferrules 31 and 32 together with the inside surface of body 11.

It is apparent from the above description of the coupling 10 of FIG. 1 that the ferrule elements 31 and 32 include two distinct significant portions; namely, the spherical sections 37 and 38 and the cylindrical sections 41 and 42. The spherical sections 37 and 38 each have their center on or near the center line C, but more specifically at the origin points O–37 and O–38 on the plane normal to the axis C which passes through the seals 25 or 26. Referring specifically to the right end of the coupling of FIG. 1, any relative movement between the ferrule 31 and body portion 11 results in movement of the cylindrical portion 41 in a direction generally normal to the axis C. Such movement in the normal direction results in local compression or release of the loading on the O ring 25. The O ring 25 and cylindrical portion 41 form a static and dynamic seal with variable loading depending upon the misorientation of the ferrule (and its mating conduit with the coupling body portion 11). The same relationship occurs between the seal 26 and surface 42. In contradiction to prior art spherical couplings, there is no seal action on the spherical surfaces. The outside diameter of O rings 25 and 26 are static with respect to the inside body surface and are dynamic with respect to the annular portion of the ferrules. The mating spherical surfaces 19 and 37 and 20 and 38 constitute dirt and moisture barriers, and bearing surfaces to permit relative movement while axially loaded with all pressure sealing between the interior and exterior of the conduits performed by the O ring seals 25 and 26.

Now refer to FIG. 2 where a coupling similar to the one of FIG. 1 is shown in full section with tubes or conduits 49 and 50 shown in section and the entire coupling and conduits shown in a degree of angular misalignment. In this and other figures, parts which are identical with most parts of FIG. 1 carry the same reference numeral. In this case, referring to the right hand end of the assembly, the conduit 49 is shown inserted into the coupling with its end resting against a step 51 in the end lip portion 53. The conduit 50 similarly rests against step 52 in the end lip 54 in ferrule 32. The conduit 49 is permanently secured to its ferrule 31, as by welding or swaging or other manners well known in the art.

In this figure, the tube 50 is shown displaced approximately 8° from the axis of the conduit 49 and the relative movement between the mating spherical surfaces 19 and 37 associated with the conduit 49 and the mating surfaces 20 and 38 are apparent. The body portion 11 and nut 14 include end openings 59 and 59a, respectively, to allow the spherical surfaces 37 and 38 to move in and out of the coupling without interference.

In the drawing, ring 170, roughly comparable to ring 17 of FIG. 1, is usually split and manufactured separately from the body portion 11. This is possible since the mating surfaces 19 and 37 perform no actual sealing function and a split in one or more places is not objectionable. However, the ring 170 may be of continuous construction or be an integral part of nut 14 or body 11 as shown in FIG. 7. Positioned at the inner end of the ring 170 is a washer 171 defining one wall of the seal retainer recess, with the other wall formed by channel cross-section back-up ring 127 being of greater length than the back-up ring 27 of FIG. 1. Washer 171 may also be integral with split ring as in FIG. 1. The length of the back-up rings 27 of FIG. 1 and 127 of this figure is determined by the extent of angulation for which the coupling is designed. The coupling of FIG. 1 is designed for approximately 8° total angulation while the coupling of FIG. 2 accepts approximately 16° of total angulation between the two conduits. It is apparent from FIG. 2 that the angulation is limited as shown at A and B of the figure where the points A and B of the split ring members 170, and its counterpart 180, engage the conduits at points D and E, respectively.

From examination of FIGS. 1 and 2, it is apparent that the couplings of this invention are unrestrained in the direction of misorientation. In FIG. 1, the two conduits are shown aligned (0° misalignment) and in FIG. 2 with maximum angular misalignment (for example, 16°). Because of the universality of both ends of the coupling, another form of misalignment is readily accepted as well. Although not shown in the drawing, the two conduits may be parallel but offset in any direction. The seal maintains its integrity in this condition as well.

Relative movement of the conduits within the limit of misorientation does not break the seal and repeated cycling of the joint does not affect its integrity.

One additional feature of this invention is apparent in FIG. 2 with reference as well to FIGS. 8 and 9. It is noted above that the rings 170 and 180 are diametrically split and therefore removable from the ferrules 31 and 32. The lips 15 and 16 of the body portions 11 and 14 have sufficient inside diameter to clear the spherical surfaces 19 and 20. Therefore, the split rings 17 and 18 and body portions 11 and 14 are removable from the ferrule 30 and 31. There are no captive parts. In order to insure sufficient hoop strength for the coupling, the split rings 17 and 18 have tapered outer surfaces adjacent to the lips 15 and 16. Triangular cross-section wedge rings 160 and 161 of high strength material such as 17 – 4 Stainless Steel (A.S.T.M. Standard) are held in the wedge-shaped opening and absorb hoop loading of the conduit. Different wedge rings may be used for different pressure and temperature applications. The inside diameters of wedge rings 160 and 161 are also of sufficient size to clear the spherical portions 37 and 38. Therefore, the couplings may be completely disassembled from the conduits, leaving only the ferrules 31 and 32 in place.

The details of the wedge ring 160 are more clearly seen in FIG. 8 overlying the split ring 170. This ring 170 includes a pair of parts 170a and 170b shown in FIG. 9 as including a C ring 172 on part 170a which engages a groove 173 in part 170b. The C ring 172 is shown in place in FIG. 8. Alternatively or additionally, the parts 170a and 170b are sometimes staked or otherwise fixed to one another, at location 170c in member 170a which engage and hold the C ring to member 170a. The ends of 172 are chamfered to accommodate engagement.

One further feature of this invention is apparent by reference again to FIG. 2 wherein the center of the spherical surface 38 is at point $O_L$ lying on plane $P_L$ normal to the axis of the conduit 50 which passes through the cylindrical surface 42. Therefore, with relative movement between the conduit and the coupling, the surface 42 varies very slightly in radial distance from the center $O_L$, thereby introducing variable compression into the O ring 26. Some sliding movement between the O ring and the surface 42 occurs in a region adjacent to the end of the conduit 50 remote from the spherical bearing surfaces 20 and 38. The O ring seals between cylindrical surfaces at all times and is maintained in sealing contact by the packing afforded by washer 124 and leg 128 of flanged ring 127. The packing is constant, as a function of the extent of tightening of nut 14 on body 11 and is not a function of angulation of the coupling or system tension. Because of this unique arrangement, reliable sealing is achieved and seal deformation is approximately one-half of that occurring in prior art seals for similar angulation.

The seal, because of the described design features, is useful for low pressure (0 to 20 psi), intermediate pressure (to 50 psi), and high pressure (up to 2,000 psi) applications over broad temperature ranges without impairing the integrity of the union.

The same concept of this invention is usable not only in a double coupling of the type shown in FIGS. 1 and 2, but as a half coupling joining a box or other manifold as shown in FIG. 3. In this case, the equipment includes a boss portion 60 having a threaded circular outlet portion 61 which mates with nut 14 identical with that of FIGS. 1 and 2. The outlet portion 61 includes an integral seal retaining wall 62 and a cylindrical wall portion 63 defining two walls of a seal recess designed to accept an O ring seal 26. Spherical mating surfaces 20 and 38 define the surface of rotation of the conduit 50 about center "O." The ferrule 32 includes the sealing surface 42 similar to the embodiments of previous figures.

In the case of the single ended coupling of FIG. 3, the conduit 50 may be actually misaligned with the opening in the boss 60 by approximately 8° without loss of seal or mechanical integrity. In this case, the boss includes clearance regions 64 and 64a to allow movement of the ferrule 32 and conduit 50 relative to the boss 60.

The foregoing descriptions all involve a seal using a threaded securing body or nut. Other types of securing means are usable and are illustrated. For example, FIG. 4 shows a single ended or half coupling similar to that of FIG. 3. In this case, the coupling is secured by a commercially available V-Band coupling 69 which engages the outer surface of a pair of conical-faced surfaces 70 and 71. The annular securing means 69 performs the same function as the nut 14 without the necessity of engaging threads. The annular face portions 70a and 71a need not have a high degree of flatness for the coupling to work since no sealing function is performed in the region of their engagement. Instead, in this case, a commercially available seal 73 known as the Omni seal or an O ring appears in the seal recess on the boss 60 and the cylindrical surface 42 of ferrule 32. Similar to the preceeding embodiments, the surfaces 20 and 38 are mating spherical segments on relative movement of conduit 50 with respect to the boss 60.

In each of the foregoing embodiments, the spherical surface is formed integrally with the ferrule. This is not manditory and in FIGS. 5 and 6, two alternate arrangements are shown. In FIG. 5, the spherical surface member 120 is secured to the ferrule member 132 by a recessed machine screw 133. In this configuration, the spherical surface member 120 may be produced using conventional ball-forming production techniques.

In FIG. 6, the spherical surface member 121 is of sheet metal and spot or seam welded to the ferrule 132 at points 135 and 136. The sheet metal member 121 is particularly designed for roll forming production. Therefore, it may be seen that the coupling of this invention is adaptable to different methods of production as well as different applications.

FIG. 7 is an example of a coupling of the same general type as in FIGS. 1 and 2, but including captive parts (when the coupling is secured to conduits). In this embodiment, the ferrules 31 and 32 include a cylindrical surface 41 and 42 as well as integral spherical surfaces 19 and 20. Coupling body portions 111 and 114 are threadably engaged and each includes as an integral part the hollow spherical surfaces 19 and 20. The body part 111 includes a step 122 against which bears a washer 123 to confine a packed O ring 25. A similar O ring 26 is confined by a washer 124 bearing against an end step 125 of sleeve portion 114a. The O rings are confined by a shaped channel ring 27 similar to its counterpart of FIG. 1.

Note in FIG. 7 that the body parts 111 and 114 may be backed off from engagement but are prevented from removal from their respective ferrule 31 and 32 by the lack of clearance with the spherical surfaces 37 and 38. Since the washer 123 and 124 are separate members as compared with the integral walls 23 and 24 of FIG. 1, the body parts may include the integral spherical surfaces and yet be slidable away from the joint when disengaged. The sealing portions of the coupling, O rings 25 and 26, ring 27 and washers 123 and 124 may be readily removed and replaced if required when the coupling nut and body are moved back but still remaining on the conduit as shown in FIG. 7.

From the foregoing, it may be seen that I have invented a new coupling designed to accept major degrees of misalignment and angulation between two conduits while providing effective low seal loading sealing of the conduits in low, intermediate or high pressure systems. Characteristic of my invention is the use of spherical bearing surfaces which facilitate the positioning of the coupling and conduit and separate cylindrical sealing surfaces so positioned to maintain effective sealing despite movement of the coupling and conduit about the center of the cylindrical surfaces. The center cylindrical surface is located on the axis of the coupling and in a plane which is normal to the axis and traverses the cylindrical sealing surfaces. This also provides a coupling which will move when a relatively low force is applied to the conduit and will remain displaced when pressurized in a tension-type system.

The above-described embodiments and process is furnished as illustrative of the principles of this invention and are not intended to define the only embodiments possible in accordance with our teaching. Rather, protection under the United States Patent Law shall be afforded to us not only to the specific embodiments shown but to those falling within the spirit and terms of the invention as defined by the following claims.

I claim:

1. A coupling for conduits comprising:

a body having an annular, internal, spherically configured section and a cylindrical section extending from said spherical section;

a cylindrical member having a spherical segment adjacent one end thereof, said spherical segment being complementary to said spherical section of said body and in mating engagement therewith wherein the adjacent end of said member extends in spaced relationship to said cylindrical section of said body;

seal means disposed between said cylindrical section of said body and said adjacent end of said member and in axial spaced relationship to said spherical segment, said seal means lying at least partially in a plane normal to the axis of the coupling and passing through the center of a sphere defined by said spherical section, said seal means being disposed for movement with respect to said member and in sealing engagement therewith;

a circumferential wall extending inward in diametrically spaced relationship to said adjacent end and in axially spaced relationship to said spherical segment of said member and disposed between said spherical segment and one side of said seal means;

wall means extending inwardly diametrically, said wall means being independent from and movable with respect to said body and in complementary spaced relationship to said circumferential wall adjacent the other side of said seal means to confine said seal in cooperation with said circumferential wall; and means associated with said circumferential wall and said wall means to control the longitudinal axial movement of said seal.

2. The combination in accordance with claim 1 wherein the coupling includes a diametrically split ring member defining said spherical section of said body, said body and split ring member define an annular groove and a continuous hoop load bearing ring is confined in said groove overlying the split ring.

3. The combination in accordance with claim 2 wherein said hoop load bearing ring and body have inside diameters greater than the maximum diameter of the cylindrical member whereby the coupling may be disassembled upon removal of the split ring.

* * * * *